(12) United States Patent
Koegl

(10) Patent No.: US 8,663,779 B2
(45) Date of Patent: Mar. 4, 2014

(54) FORMWORK PANEL WITH FRAME CONTAINING AN ELECTRONIC IDENTIFICATION ELEMENT

(76) Inventor: Martin Koegl, Munich (DE)

( * ) Notice: Subject to any disclaimer, the term of this patent is extended or adjusted under 35 U.S.C. 154(b) by 732 days.

(21) Appl. No.: 12/449,293

(22) PCT Filed: Jan. 31, 2008

(86) PCT No.: PCT/DE2008/000179
§ 371 (c)(1),
(2), (4) Date: Jul. 31, 2009

(87) PCT Pub. No.: WO2008/092439
PCT Pub. Date: Aug. 7, 2008

(65) Prior Publication Data
US 2010/0090089 A1    Apr. 15, 2010

(30) Foreign Application Priority Data

Jan. 31, 2007  (DE) .................. 10 2007 004 903
Jan. 31, 2008  (DE) .................. 10 2008-007 015
Jan. 31, 2008  (DE) .................. 10 2008 007 039

(51) Int. Cl.
*B32B 7/00*    (2006.01)
*E04G 9/02*    (2006.01)

(52) U.S. Cl.
CPC .... *B32B 7/00* (2013.01); *E04G 9/02* (2013.01)
USPC .......................................... 428/119; 249/189

(58) Field of Classification Search
USPC ........................................... 428/119; 249/189
See application file for complete search history.

(56) References Cited

U.S. PATENT DOCUMENTS

| | | | | |
|---|---|---|---|---|
| 1,282,719 A * | 10/1918 | Storvick | ...................... | 312/140 |
| 2,816,632 A * | 12/1957 | Nardulli | ....................... | 52/656.7 |
| 3,729,241 A * | 4/1973 | Schippers et al. | ............ | 312/107 |
| 3,826,551 A * | 7/1974 | Schwartz | ....................... | 312/140 |
| 5,125,348 A * | 6/1992 | Horwitz | ........................ | 108/180 |
| 2003/0174099 A1* | 9/2003 | Bauer et al. | ................... | 343/893 |
| 2004/0224135 A1* | 11/2004 | Krebs | ......................... | 428/195.1 |

FOREIGN PATENT DOCUMENTS

| | | |
|---|---|---|
| DE | 20005975 U1 | 3/2000 |
| EP | 0790112 A1 | 1/1997 |
| EP | 1 273 738 A2 | 3/2002 |
| EP | 1426525 A1 | 10/2003 |
| WO | WO 2004/072408 A1 | 8/2004 |

\* cited by examiner

*Primary Examiner* — Michael Safavi
(74) *Attorney, Agent, or Firm* — Karl F. Milde, Jr.; Eckert Seamans Cherin & Mellott, LLC

(57) ABSTRACT

A shuttering element for producing concrete and reinforced concrete structures comprises a multi-layer panel and a frame element which at least partially surrounds the multi-layer panel and provides at least one identification element that can be contactlessly written on the read form. Methods for producing and repairing such shuttering elements are also provided.

19 Claims, 14 Drawing Sheets

FORMWORK PANEL WITH FRAME CONTAINING AN ELECTRONIC IDENTIFICATION ELEMENT

The present invention concerns a formwork element, in particular for the production of concrete- and reinforced structure, comprising a multilayer panel, which is arranged on or in an the multilayer panel surrounding frame element. In addition the invention concerns a method for manufacturing such formwork elements.

BACKGROUND OF THE INVENTION

Formwork elements of the kind, specified above provide a wide spectrum of different applications in the construction industry, which can vary from the conventional house building over civil engineering to special underwater buildings. The formwork elements are exposed to distinctive mechanical, chemical and environmental influences such as wind, water, ice, heat etc., which sets high demands on the used materials.

By the variety of different formwork elements required by a complex building project, the planning and accurate controlling of the required elements gains an enormous importance. Especially in the planning phase of the building projects, an exact determination of material requirement of the used formwork elements is an essential part of the complete building design. Beyond that, some formwork elements will be used a couple of times in various building phases, in order to delimit the costs for materials. Therefore, in the area of logistics and building design, a clear identification of a specific system component is of crucial importance, since significant problems can occure due to wrong deliveries or incorrect installation of the different formwork elements, which can affect time- and cost planning unfavorable.

Many companies are anxious about obtaining precise knowledge in a very early stage of the building design phase about which structural elements at which time at which place has to be built in, in order to be able to react accordingly, already at the delivery of the formwork element. Moreover it is of advantage regarding the partially available stockyard on construction sites, to already incorporate at the storage of the formwork elements, the later use in the construction phases into the stock management planning.

Also, a key aspect in connection with the identification of formwork elements represents the theft protection. Here the problem of deliberate destruction of distinguishing features have an effect, which makes it extremely difficult for companies to claim property rights, during insolvency proceedings for example.

In order to meet the requirements of the construction industry, the state of the art provide different possibilities, which refer to specific components of a formwork element, such as a frame element, panels, or formwork beams for example and which makes identification possible.

In the following, formwork elements are divided into two categories. First of all, into the category of the framed formwork elements, consisting of a formwork board which is arranged in, onto or on the frame element, which is also named as frame formwork and into a second category, the so called formwork beams, which comprises a panel or a carcass- or grid construction consisting of panels with a top- and bottom chord.

High demands regarding the static stress are made to a formwork element and beyond that, the formwork panel should be also good nailable and screwable in order to be able to fasten for example different support parts such as block outs for doors or windows to the formwork panel.

The formwork panels described in EP 1,426,525 A1 shows a panel shaped core, a front and rear side as well as a layer from wood-flour-filled polypropylene (HMPP), which are printed, or is provided with a printed laminate layer, in particular with a printed on polyolefin film. These can be provided with information concerning manufacturers, manufacturing date, etc. or other references, as well as be printed with a special design, which increases the recognition value.

The EP 1,273,738 A2 also describes a formwork element that exhibits a panel shaped carrier, which is covered with a foil on at least one side. This can be printed or pasted likewise and thus an identification of such formwork elements is made possible.

A formwork beam as a further possible embodiment of a formwork element is described in the WO 2004/072408. This state of the art shows a formwork beam, which provides an improved insusceptible to shock due to its special embodiment in the front areas of the carrier.

Also here the components can be printed variously, pasted, to seal with leads, labeled, etc. so that a visible identification is possible. In order to fulfill the high mechanical, chemical or weather-related requirements of such identification means, also signs of most diverse materials are fasten onto, e.g. riveted, pasted, screwed, etc.

Already during the planning phase of building projects, at manufacturers and suppliers of such formwork elements these are increasingly rented, so that the renter get a tailored and functioning number of suitable formwork elements at his disposal. During renting of such elements, deliberate destroying, respectively intentional removing as well as unrecognizable making of the above mentioned identification means is hardly to prevent and represents a large risk potential for the lesser.

However, even at the appropriate use of such formwork elements, they can be damaged or made useless by the everyday use in a harsh building site, like cleaning with high pressure water cleaner, or staining with concrete, dirt, dust, ice. etc., as well as impacts by adjusting or releasing of connecting elements.

A frequently occurring problem is additionally that in many building projects inventory formwork elements as well as rented formwork elements are often used together. Many enterprises have a basic assortment of formwork elements and rent appropriate elements in addition for special requirement. The explicit identification of the inventory elements as well as the rented elements, at an inventory for example, it therefore also becomes a great importance.

SUMMARY OF THE INVENTION

The task of the present invention is it therefore to create a formwork element, with consideration of the above specified requirements and disadvantages, which is improved in a simple and economical way regarding its identification ability.

This task of the present invention is solved according to the invention with a formwork element according to the independent claims. The dependent claims refer to favorable modifications as well as favorable embodiments of the invention.

The present invention is based on the idea, to improve the identification of formwork elements by the fact that the therefore necessary identification elements are made in such manner that the possibility of a deliberate, or a by everyday work caused removing or damaging of that identification elements, is reduced to a minimum.

Furthermore, it is thereby favorable that none visual detectability of the identification elements can prevent intentional removing. Thereby, the characteristics of the formwork elements regarding modularity, durability, maintenance and the required performance data should accommodate in a sufficient way. Further advantages result likewise from the storage of relevant data on the identification elements, because therefore, costs in the IT for complex data base inquiries or data merging costs in distributed IT-systems can be reduced.

For this, according to the invention, it is intended that by minimum invasive changes in the production flows of the manufacturing of formwork elements, identification elements in different components of a formwork element of different types, are implemented in such way, so that a clear identification of the formwork elements is facilitated.

It is differentiated here, between on the one hand the multilayer panel and on the other hand the frame element as the main components of the formwork element, which are both provided with characteristics, which improves the identification possibility of the formwork elements substantially. The arrangement, according to invention, can consist of a multilayer panel and a the multilayer panel surrounding frame element, whereby at least one identification element is provided that can be writeable and/or readable without contact.

The multilayer panel offers thereby the advantage of the simple insertion of an identification element into the panel, whereby the multilayer panel can consist of at least two layers and that between the at least two layers of the multilayer panel, at least one contactlessly write- and/or readable electronic identification element can be arranged and therefore the identification ability is surprisingly increased.

Here, the multiple existence of an identification element can be of essential importance. By the favorable insertion of several identification elements, the formwork element can be provided with a higher redundancy regarding its identification characteristics, which can increase the identification safety significantly. At the same time the multilayer panel would maintain its simple and robust construction, which can particularly positively affect the fulfillment of the requirement profile of such generic panels and allow a modification in the sense of the invention.

In this context, the multilayer panel according to another embodiment can be joint with its at least partly surrounding frame element force- and/or form-locked and/or materially bonded. In this way, different connectivity options are provided, which can be applied on the different suitable further development in the present invention.

Regarding this background in accordance with a further objective of the invention, it is also provided that the multilayer panel is connected permanent or removable with its at least partly surrounding frame element. Thereby, the multilayer panels as well as the frame elements meet the different requirements regarding flexibility during reparation, maintenance, or corrective-maintenance.

In accordance with a further embodiment of the multilayer panel according to the invention, at least one layer of the at least two layers of the multilayer panel is designed as panel core. Regarding this configuration of the multilayer panel according to the invention, it is particularly preferred that at least one layer of the at least two layers of the multilayer panel is designed as coating. In this way, a very simple construction of the multilayer panel, which additionally can ensure an economical manufacturing process, is facilitated.

A particularly preferred embodiment of the multilayer panel, can be achieved by a special configuration of the different layers, whereby between the at least two layers of the multilayer panel, at least one contactlessly write- and/or readable electronic identification element can be joint with the multilayer panel not visible and force-locked. Moreover it is particularly preferred that the contactlessly write- and/or readable electronic identification element is designed as an integral part of at least one layer of the at least two layers of the multilayer panel. Thus the load capacity of the multilayer panel is hardly changed and can even cause an improvement of the load capacity with an optimal adjustment of the layers. In order to obtain a simple production of the formwork element according to the invention, it is preferred according to a further embodiment of the invention that the at least two layers of the multilayer panel are joined with a connecting insert at their opposite sides.

It is particularly preferred that the connecting insert is preferable designed as a fiber mat, or it is based on an adhesive. Here it is proved as particularly preferable that at least one contactlessly write- and/or readable electronic identification element can be preferable joined integrally with the connecting insert, or can be fixed by recesses in the connecting insert.

In particular the at least one contactlessly write- and/or readable electronic identification element can be integrally joined with the connecting insert preferably in circle, -ellipse, -cross, -or rhombic paths or in coincidentally selected areas. Since the production of the identification elements constantly increases, the costs for acquisition of the tags are in a economically justifiable range, so that the costs of the use of several tags in comparison with the manufacturing costs of the complete formwork element are comparatively low.

A further preferable embodiment of the present invention is a formwork element, preferable consisting of at least one multilayer panel and one the multilayer panel at least partly surrounding frame element, whereby the frame element can be designed as a panel carrier and the frame element provides at least one contactlessly write- and/or readable electronic identification element. Thereby a second important main component can be equipped in an amazing way with sufficient identification characteristics. Regarding this background it is a further objective of the present invention that the frame element surrounds the multilayer panel at the edges and/or from the underside by all sides. Preferable, the multilayer panel is designed as a solid panel, which enables a uniform surface during a concrete casting process and in order to be able to distribute more easily and more effectively the different pressure distribution, which can occur for example during a concrete casting process.

It is particularly preferable if the contactlessly write- and/or readable electronic identification element is placed on a side turned away from the exterior and/or in a place inside not visible from the outside, yet within the peripheral structure of the frame element. In this way the formwork element according to the invention can provide no visually detectable identification elements and would therefore prevent the identification elements from deliberate removal or destruction.

A further preferable embodiment of the frame element is the use of the contactlessly write- and/or readable electronic identification element as an integral component part of the frame element. At this preferable embodiment, the identification element can be joined with the frame element in such way, so that the identification element can be connected within and/or integrally with the frame element material.

Since the frame element in particular must resist extreme mechanical influences during its period of application, for example on building sites and suchlike, the frame element can preferably be manufactured of at least 20% of a metallic material. The metallic component increases the rigidity, as well as the durability and increases thereby the life cycle of such generic frame elements. Further preferred materials are ceramics, plastic, bonding materials or natural materials like for example wood, respectively wood composite materials.

According to a further preferred embodiment of the formwork element of the invention, the form of the frame element can be distinctive in such kind so that the formwork element preferably consists of at least one multilayer panel and a frame element, whereby the frame element can be designed as formwork beams and that the multilayer panel, which can be formed as a bar, is at least partly surrounded by a top- and bottom chord and provide at least one contactlessly write- and/or readable electronic identification element.

Preferable, the formwork element which can be designed as a formwork beam, can be modified in such a manner, so that the multilayer panel, which can be formed as a bar, is at least partly surrounded by a top- and bottom chord and the bar is formed as a solid bar. Furthermore it is preferable that the formwork beam provides a frame element which surrounds, at least partly as a top- and bottom chord, the multilayer panel which is designed as a bar and the bar is formed as a framework bar in order to realize the greatest possible rigidity in combination with weight reduction.

It is particularly preferable that the multilayer panel which is designed as a bar between top- and bottom chord provides at least one contactlessly write- and/or readable electronic identification element. This embodiment can be regarded as particularly preferable, because thus the production of the formwork beams can be done without changes in the production process. Preferable the insertion of the identification element can be done during the production of the bar.

A further objective of the present invention is therefore taken into account that the frame element at least partly surrounds as a top- and bottom chord the multilayer panel which is designed as a bar and at the joint of the top- and bottom chord or the covers of the front sides with the multilayer panel, at least one contactlessly write- and/or readable electronic identification element is provided. With the incorporation of the identification elements at the joints, a further simplification of the production process is achieved.

Furthermore, in this regard it is preferable that at least one top- and/or bottom chord provides at least one contactlessly write- and/or readable electronic identification element as an integral part component. Regarding a subsequent incorporation of an identification element into the formwork beam, it is therefore of advantage to incorporate the tag in either the top chord or the bottom chord, or also in both chords.

Since a majority of the today's standard formwork beams are provided with front side covers it is therefore particularly preferred that at least one contactlessly write- and/or readable electronic identification element is designed within at least one front side cover as an integral part.

Further, the formwork element that comprises a frame element and a multilayer solid panel can be supplemented in such way so that a subsequent incorporation of a contactlessly write- and/or readable electronic identification element is facilitated as simple and economical as possible. For this purpose, a contactlessly write- and/or readable electronic identification element can be for example mounted between the multilayer panel which is designed as solid panel and the multilayer panel surrounding frame element.

Advantageously, the contactlessly write- and/or readable electronic identification element can be incorporated not visible within a gap, which can be formed by the multilayer panel which is designed as solid panel and the multilayer panel surrounding frame element. Thereby an additional intervention into the structural characteristic of the multilayer panel and the frame element is avoided, since no recess or placeholders for the identification element must be created. This formwork element modification of the invention is based on the fact that between a multilayer panel and the frame element a gap can be formed, which is designed as an expansion area.

As particularly preferred embodiment of the formwork element is the filling up of the expansion area with a flexible material. Thus the volume growth for example with multilayer wooden panels by swelling, caused by wetness and humidity can be taken into account.

Due to the broadly defined requirement profile to a formwork element, the contactlessly write- and/or readable electronic identification element, in the following tag, obtains a decisive role. Not only that this identification element must restrain the site conditions in the everyday life on a building site, it must be also conceived in such way that it must cope with the influences in the production process of the formwork element without being damaged.

For this purpose the necessary identification elements are embed into particularly manufactured casings made of different plastics, ceramics, metals or composite materials. These casings should protect the electronic areas for example an analog circuit for sending and receiving, a digital circuit, a permanent memory, a possibly existing energy storage, as well as an antenna against external mechanical, thermal or also chemical influences and ensure an error-free operation of the identification elements in all application areas.

Regarding the types of use or also areas of application of the tags, two different wireless data communication technologies are preferable, which differ in principle by the different data signal transmission techniques. Here on the one hand the so-called "backscatter"-procedure is use, which reflects a radio signal sent by a reading device, or modulate information onto the respective signal, respectively field by field-weakening in the contact-free short-circuit. The communication unit for this used is also called transponder. On the other hand a communication unit is used, which is also designated as a transceiver, whereby their data transmission based on a signal sent by the transceiver.

The various tags can also be differentiated by their internal power supply elements. As a further particularly preferred embodiment, at least one contactlessly write- and/or readable electronic identification element can be based on a passive radio data communication technology, which does not need to provide an internal power supply. The advantage here consists of the fact that the passive tags generate their energy for the supply of the microchip from the received radio waves.

Furthermore it can be for example provided that at least one contactlessly write- and/or readable electronic identification element can be based on an active, or also a semi-active radio data communication technology, which can provide an internal power supply. These generic tags can be equipped with batteries, which are responsible for the power supply of the microchip, but also used for the energy transmission of transceivers and which can be able to facilitate a significant higher range for the writing and/or reading of the tag data, than passive tags.

In this respect, it is also a preferred objective according to the invention that the tag can be based on a radio technique, which can work at low frequencies between 30 Hz to 1 MHz. Here it is particularly preferred that the frequency can be in the range from 120 kHz to 132 kHz. Especially preferred in this frequency range is the frequency 125 kHz or 131 kHz and that the electromagnetic energy field which is needed for writing and reading of the tag-data, provides a magnetic portion of at least 60%.

A further objective of the invention is that the tag can be based on a technology, which can work at high frequencies within the range of 3 MHz to 30 MHz. In the range of the high frequencies here a frequency at 4.91 MHz or 13.56 MHz is favorable. In this case, it is particular preferred in the sense of the invention that the electromagnetic energy field can provide a magnetic portion of not more than 45%.

Regarding a further objective of the invention, the use of a radio data communication technology is preferred, which can work within a range with very high frequencies from 400 MHz to 6 GHz. The frequencies 433 MHz, 868 MHz, 915 MHz, 950 MHz, 2.45 GHz, or 5.8 GHz have been proved as particularly preferred frequencies. Further it is particular preferred that the energy field at frequencies in the range from 400 MHz to 6 GHz can provide a magnetic portion of not more than 20%.

Furthermore, communication bandwidth from 300 to 9600 baud are favorable, particularly preferred can be 1200 baud. In view of a radio data communication technology which works with high, or very high frequencies, reading processes in the range of 150 to 200 reading processes per second can be particularly preferred, whereas at low frequencies below 3 MHz the amount of reading processes in the range from 5 to 20 reading processes per second are particularly preferred.

Further, the invention provides a procedure for manufacturing of a formwork element. The procedure according to the invention facilitates an economical production of an innovative formwork element of different design that can provide significantly improved identification capabilities and which additionally has the advantage that only small changes in the industrial process has to be made and a subsequent adaptation of existing formwork elements is also facilitated.

Furthermore, the invention provides an additional procedure in accordance with a further objective, which facilitates for example the subsequent inserting of an identification element during repair- or maintenance services at the formwork elements.

Additionally, a method of producing a formwork element is provided, whereby an electronic identification element is fixed to, or is fixed inside the formwork element. Further, a method for producing a formwork element is provided, in particular for the production of a multilayer panel, whereby the procedure covers the following steps. First providing a first panel layer, than applying at least one identification element, than providing a second panel layer and afterwards joining both panel layers. And as a further step, writing the identification elements with data.

Furthermore, a method for producing a formwork element is provided, in particular for the production of a panel carrier, whereby the procedure covers the following steps. First, provide a pipe profile, than inserting the identification element from the open end sides of the pipe profile and coating the panel carrier with a coating and afterwards writing the identification elements with respective data.

Further, a method for producing a formwork element is provided, in particular for the production of a formwork beam, whereby the method covers the following steps. First, provide a top chord, provide a framework or solid bar and provide a bottom chord. As a next step, insertion of the identification element with the final assembly of the top- and bottom chord to the framework or solid bar. The formwork beam can be also provided with a beam-end protection cap with integrated identification element or the identification element can be inserted into the joint area between the beam-end protection cap and the formwork beam structure. Finally, the identification element can be provided with data from a reader, respectively from a writer.

A further method for insertion of identification elements in a formwork element, even subsequently, is provided by the present invention, whereby the method covers the following steps. A multilayer panel has to be provided at first. Afterwards, cutting, sawing or drilling of the damaged areas. Now, the insertion of an identification element into the so formed recesses has to be done. Afterwards, at least parts of the remaining space inside the recess should be filled with filling materials or with adhesives in order to protect the identification element. Adapted plugs should be put in the remaining recesses, which could be sealed afterwards. Finally, the surface should be coated and the identification element should be supplied with data.

At the same time, the formwork element still possesses a simple construction so that well-known and a generic formwork elements can be modified in view of the invention. Furthermore, the use of the present invention in scaffolding and trade fair constructions is conceivable and favorable.

Since the improvements of the state of the art according to the invention can be realized with simple, economical devices and procedures, surprising advantages arise regarding costs, efficiency and sustainability, because the embodiments according to the invention also facilitates subsequent modifications of already produced formwork elements. Thus a complete and constant identification- and logistics chain of formwork elements already circulated up to newly produced formwork elements, as well as their components can be ensured.

Further details of the invention result from the following detailed description and the attached schematic figures, in which preferred embodiments of the formwork element according to the invention are described in detail. However, these embodiments are not meant to delimit the invention in any way and have an exemplary character.

The above mentioned features can be combined in any way, partly or as a whole.

There has thus been shown and described a novel device and method for producing shuttering elements which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

DETAILED DESCRIPTION OF PREFERRED EMBODIMENTS

Preferable embodiments of the formwork element according to the invention are described in the following in detail with reference to the accompanying figures.

Figure 1:
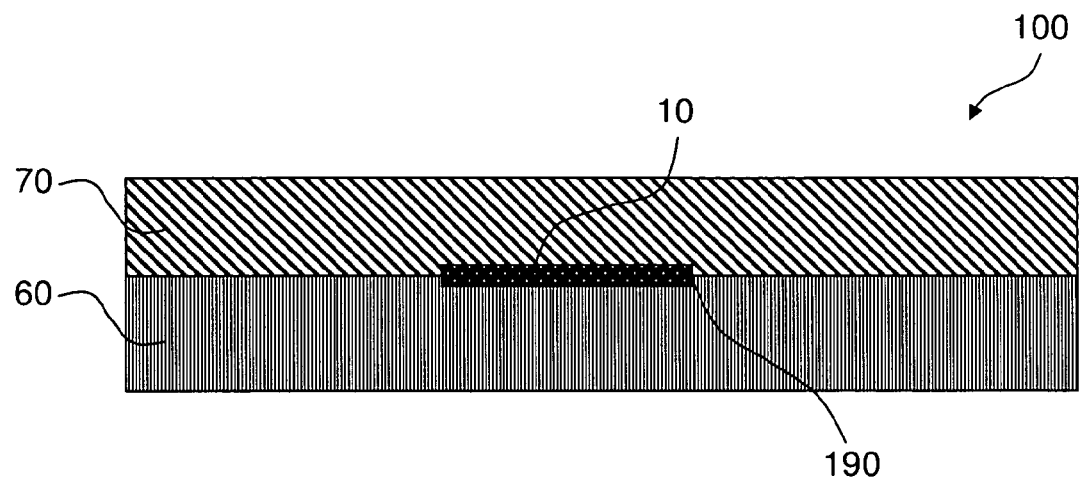
FIG. 1 shows a sectional view of a multilayer panel of the first embodiment of the formwork element according to the invention with two different layers.

FIGS. 1 to 6 are showing schematically particularly preferred designs of a first embodiment of a formwork element according to the invention. The multilayer panel 100 which is shown in FIG. 1 consists, according to the invention, of a first layer 60 and a second layer 70, which can consists of different materials. In an embodiment which is not shown, the two layers can be as well manufactured from the same material. Some materials are proved as particularly robust and resistant, which fulfill the high standards to the load capacity and the modulus of elasticity (measurement for the rigidity).

Here, usually it concerns wood, respectively wood composite materials, which can be manufactured by pressing of different wood parts like panels, rods, veneer, veneer strips, splinters and fibres with adhesive or bonding agents. The different wood components can be arbitrarily arranged in their dimensions and strength, as well as regarding their position. Commercial panels are for example OSB chip boards, veneer plywood-, multiplex-, MDF-, HDF panels, in addition, multilayer solid wood panels. Also the use of other nature materials, like hemp or bamboo is conceivable here.

Beyond that, an electronic identification element 10 is shown in FIG. 1 which is arranged not visible between the two layers 60 and 70. In a not shown embodiment the identification element is visibly arranged in between the two layers. As it is shown in this figure, the identification element 10 can be stored in recesses 190, which are formed in both layers. The identification element 10 concerns a so-called transponder or transceiver, which is based on a passive radio data communication technology. Here it concerns a so-called radio frequency identification technology (RFID). In a not shown embodiment, the RFID transponder mainly consists of a permanent memory, a digital circuit, a analog circuit for receiving and sending, an antenna, an energy storage, as well as a carrier and a case. Beside the RFID technology, also different radio network standards, for example WiFi, ZigBee, Bluetooth or RuBee can be used.

Into the identification element 10, a current is induced into the antenna by an alternating electromagnetic field, which is able to activate a microchip, so that it can receive commands from a reader and can modulate an answer into the electromagnetic field sent by the reader. This answer can contain data, which were stored in the appropriate memory. A major advantage lies in the fact that these data regarding the formwork element according to the invention, can contain different information, like for example type designation, manufacturer and manufacturing date, weight, material as well as buyer, respectively borrower identification numbers etc. Additionally, information regarding the building project can be of importance, as for example information concerning the building site or the accurate location in a complex formwork system.

Regarding the stored data of the formwork elements according to the invention it is very favorable, to store and secure these data in networked, distributed systems. By a complex distributed data base- and system structure, data losses are avoided and world-wide accesses to the data are guaranteed, so that a constant and complete life cycle of a formwork element according to the invention can be illustrated. Thus at each time an exact, overall and automatic data alignment can be facilitated.

Because of the fact that the used passive transponders provide no internal power supply, they can be produced relatively cost-efficient. Regarding the insertion into the formwork elements according to the invention, different design of the identification elements can be selected. As in FIG. 1 schematically shown, the identification element can have a height of several hundred micrometers up to several millimeters, as well as the surface area varies from some square millimeter up to some square centimeter. Furthermore, the used transponder can be made of materials which provide a insensitivity against mechanical or chemical influences particularly during the production process of the formwork element according to the invention.

Here also organic electronics can be used, which are favorable regarding the recycling. These organic circuits consist of conductive polymers or smaller organic compounds, whereby these electronic polymers consist of conjugated polymer main chains.

Figure 2:
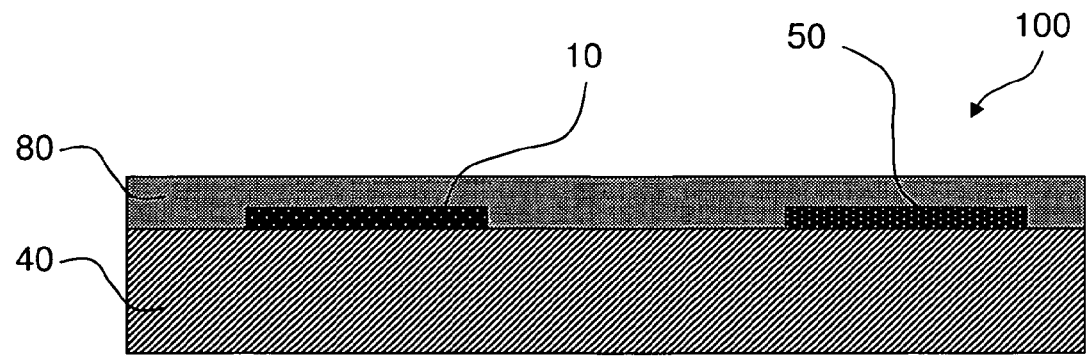
FIG. 2 shows a sectional view of a multilayer panel of the first embodiment of the formwork element according to the invention with a coated panel core.

FIG. 2 shows a partial sectional view of a multilayer panel 100 of the first embodiment of the formwork element according to the invention with two different layers. Here the panel core, respectively panel carrier 40 is supplied with a coating 80. The shown panel core 40 provides a height, which is larger than the height of the coating 80. The panel core 40, as a first layer, can be manufactured for example also from a foamed, a honeycombed or a solid plastic panel. There are also different composite materials conceivable, as for example fiber composite material or metal, respectively metal-composite materials, which can provide a panel with sufficient characteristics regarding stiffness and rigidity.

The coating 80 shown in FIG. 2, which is designed as the second layer for example can be aligned to different purposes. As particularly preferable, the coating 80 is designed as a sealing or a protective layer of the beneath placed panel core 40. Here, the coating 80 prevents that humidity or other substances can penetrate the panel core 40 and perhaps damage this. Preferable materials can be for example metals or different fiber composite materials.

The coating 80 according to the invention can also be regarded as protective layer for the electronic identification elements 10, 50. During the production of such panels, the identification elements 10, 50 are applied on the panel core 40 and are interconnected force-locked or materially joined with the panel core during the coating. The used tags 10, 50 provide an appropriate sheathing, which can withstand the high temperatures and pressures during pressing or coating of the multilayer panel. The used materials for the sheathing of the tags 10, 50 are mainly plastics or also composite materials, which withstand also temperatures of up to 200° C., without deterioration of their functionality.

The illustration in FIG. 2 shows, two different types of tags 10, 50, which are applied inside the formwork element according to the invention. The use of more than one tag represents an enormous advantage, due to the higher number of tags, the required higher redundancy regarding the desired identification safety can be realized. The redundant tags are needed thereby, because during formworks, box-outs or shuttering parts are mounted onto the formwork element by screws or nails, which can perhaps make a tag useless. Therefore, the identification safety increases with the amount of tags.

The transceiver 50 shown in FIG. 2 is based on another radio data communication technology than the transponder 10. Here, it concerns a data signal sending transceiver 50, which is part of a new data communication system with the name RuBee that uses a data protocol which enables the specific transceiver-tags to link them together by a bi-directional, on-demand, peer-to-peer network architecture. The system mainly consists of specific tags (transceiver 50) which works at a frequency below 1 MHz and provide an integrated circuit, a oscillating circuit (quartz), an internal power supply as for example a lithium-, respectively an alkaline battery and a data storage unit. Additionally, a reading device (PDA), a frame- or array antenna, or also a central computer unit can be used.

These identification elements can be additionally divided in active and semi-active tags 50 and have various prolonged operating times, whereby active elements provides only a shorter life time due to their permanent activity. However, semi-active tags are put into a sleep mode and sending data only, if they are activated by a wake-up signal which furthermore leads to longer life times. Therefore mainly semi-active tags are used, compared with the active ones, because operation times are calculated from five to twenty years.

Figure 3:
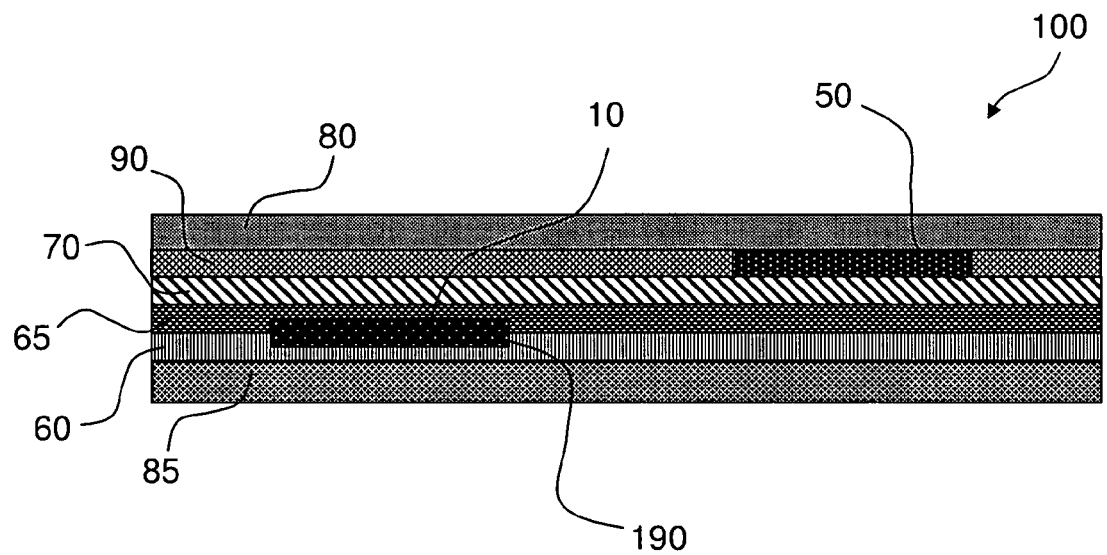
FIG. 3 shows a sectional view of a multilayer panel of the first embodiment of the formwork element according to the invention with several layers.

As can be seen in FIG. 3, it concerns a multilayer panel 100, which is coated on both sides. The upper coating 80 has special characteristics regarding mechanical or chemical resistance in relation to effects from the outside. Because both, the upper coating 80, as well as the bottom coating 85 could have direct contact with concrete, they should be easily cleaned. In order to additionally increase the scratch- and abrasion resistance as well as the general resistance, the coating could provide for example a nano-tube structure and to improve the cleanability of the coating, a nano-coating can be applied, which generate the so-called lotus effect artificially.

The second layer 90 can provide a semi-active transponder 50 in a recess, which extends over the total layer thickness, which represents a simplification in the production process. As is likewise shown in FIG. 3, a transponder 10 can also be inserted by opposite recesses 190 of two layers 65, 60 which do not extend beyond the total layer thicknesses.

In an not shown embodiment, a further layer 70 can be equipped with a glass, -metal-, or plastic fiber structure that can detect damages of the formwork skin, respectively the coating and can transmit the information to a tag, which is able to store and/or transmit these information if required. Thus an intelligent formwork element can be realized, which can supply information concerning their material condition to specific means for reading as to the so called reader, which for example can be used for the detection of weak points such as tears, or to proof ageing processes or changes of dimension tolerances. By the use of different integrated sensor elements, the tags could detect, store and transmit the pressure, temperature, stretch or humidity in the different components of the framed formwork to respective reading units.

Both coatings 85, 80 can consists for example also of a foil of polypropylene, polyethylene, polyvinyl chloride or on a phenolic resin coating, which are laminated, glued or rolled onto etc. during the production process. As it is exemplarily shown in FIG. 3, a multilayer panel 100 can be realized as multiplex-, or multilayer veneer wood panel. In a not shown embodiment, the multilayer panel 100 can also have six or more layers.

Figure 4:
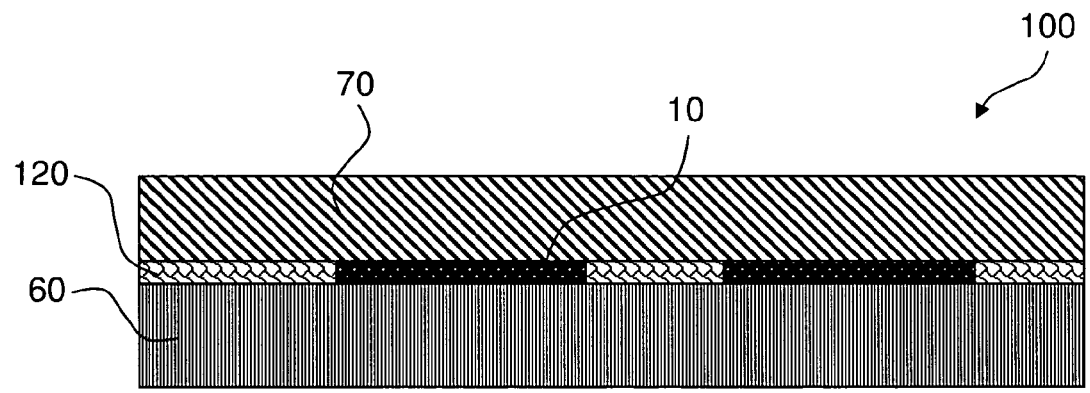
FIG. 4 shows a sectional view of a multilayer panel of the first embodiment of the formwork element according to the invention with two layers and a session layer.
Figure 5:
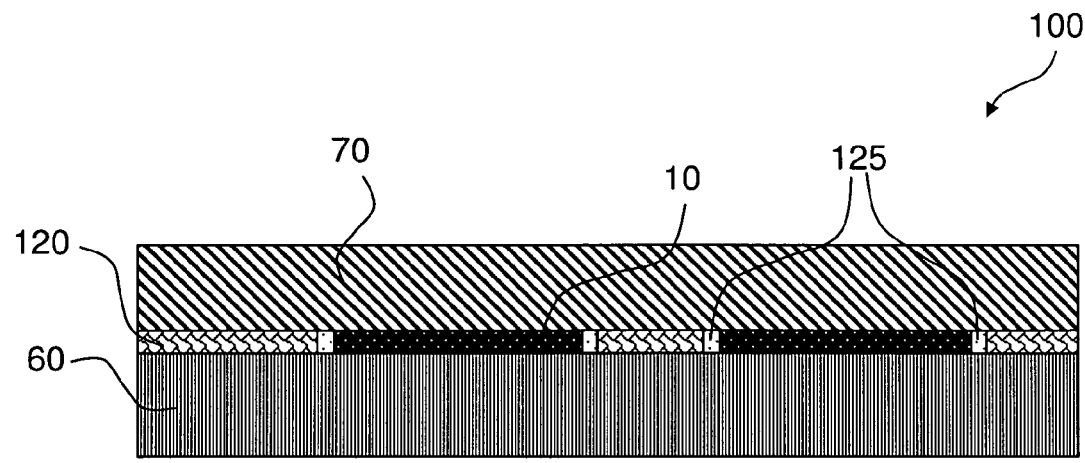
FIG. 5 shows a further sectional view of a multilayer panel of the first embodiment of the formwork element according to the invention with two layers and a connecting insert with recesses.

An optimized panel structure for the production of the multilayer panel is however shown in the partial section in FIG. 4 of a multilayer panel 100 with a first and a second layer 70, 60, whereby between the both layers 70, 60 a connecting insert 120 is placed. This connecting insert is inserted between the opposite surfaces of the layers 70, 60 and has a lower height than its surrounding layers 70 and 60. The advantage of this connecting insert 120 is that it can be designed as a mat and can consist of synthetic fiber, -glass fiber optics, -natural fiber materials, a fleece or felt. Therefore, it is provided with the necessary flexibility as well as rigidity in order to be processed optimally in the production process. Further it is preferable that the distance between the receiving units of the tags is at least 1 mm, in order to reduce the mutual electromagnetic influence of the tags.

The passive transponder 10 shown here is integrally connected with the connecting insert 120, which enormously simplifies the incorporation of a transponder 10 or a transceiver 50 during the production process. Preferably, the connecting insert can be made from adhesives, which additionally can provide a form-locked or materially joined interconnection between the first layer 70 and the second layer 60. There are different thermoplastic adhesives usable, which makes a permanent interconnection under heat supply between the connecting insert 120 and the two layers 70, 60, but can also be removable.

Due to the fact that the used materials could have different coefficients of expansion, it is therefore preferable that a gap 125 which serves as expansion area is provided between the tags 10, 50 and them at the edges surrounding connecting insert 120. The gap 125 shown in FIG. 5 can also be filled with an adhesive or a flexible material, which provides the necessary flexibility and rigidity during different weather-related influences such as heat or coldness. The connecting insert 120, which provides at least one integral transponder or transceiver is designed as mat and is applied during the production on the second layer 60, the gap 125 is filled up afterwards with a material that fulfill the requirements of a generic panel. Afterwards the first layer 70 is applied and is than permanently interconnected under pressure or also by heat supply. The used materials should also be separated easily and be reusable in order to sufficiently take care about the concept of environmental protection.

Figure 6:
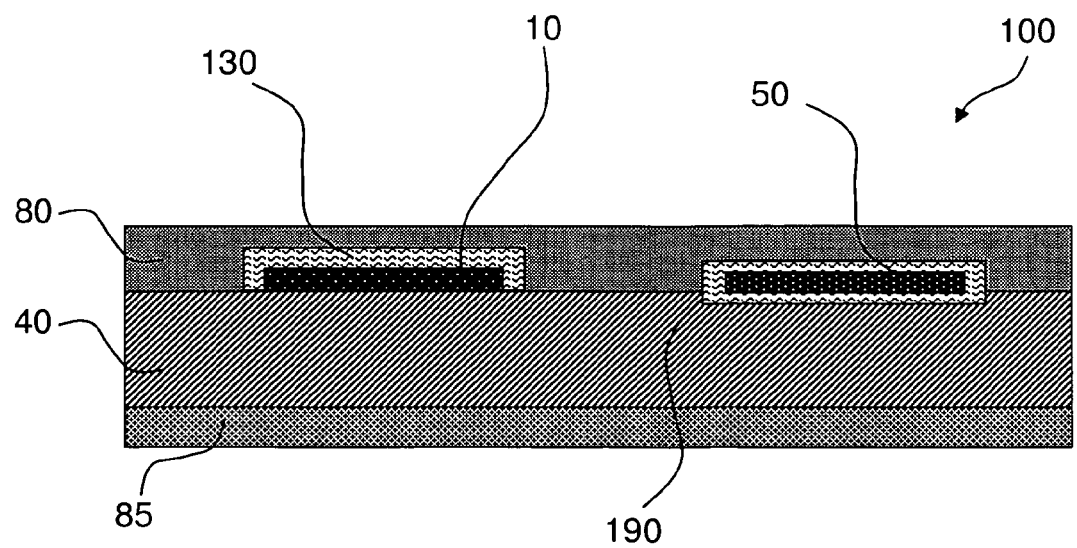
FIG. 6 shows a sectional view of a multilayer panel of the first embodiment of the formwork element according to the invention with three layers.
Figure 7A:
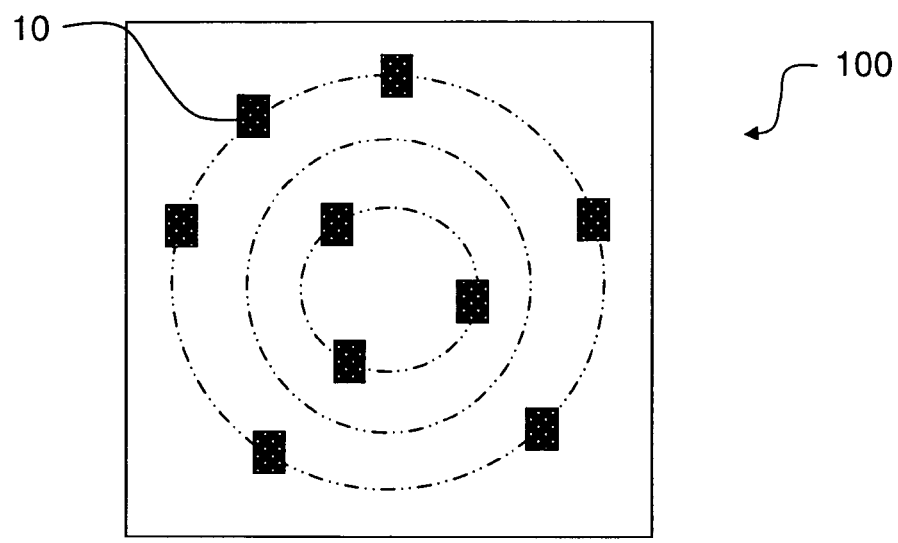
FIGS. 7a, b, c, d, e shows a schematic top view of a multilayer panel of the first embodiment of the formwork element according to the invention with circular, elliptical, rhombical, coincidentally distributed tags or an arrangement of the tags, which is congruent with the formwork frame.
Figure 7B:
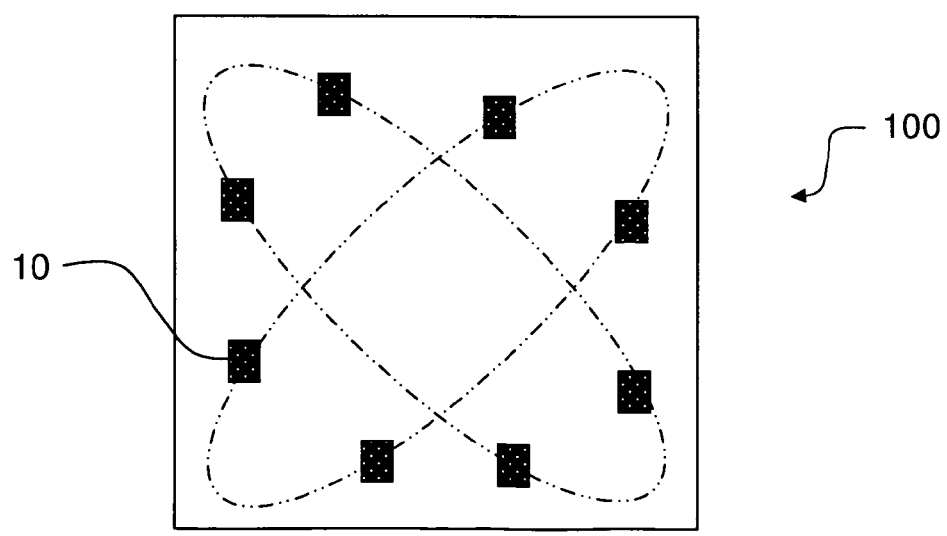
Figure 7C:
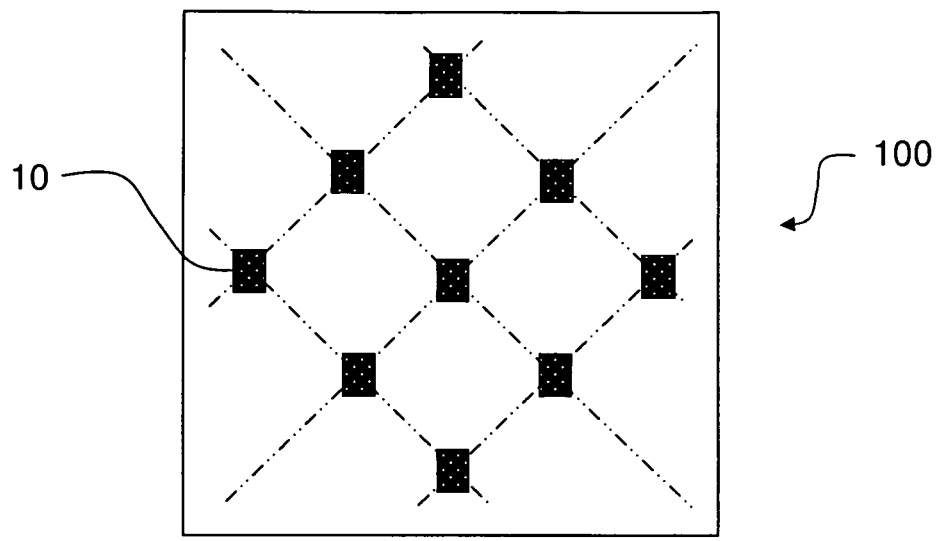
Figure 7D:
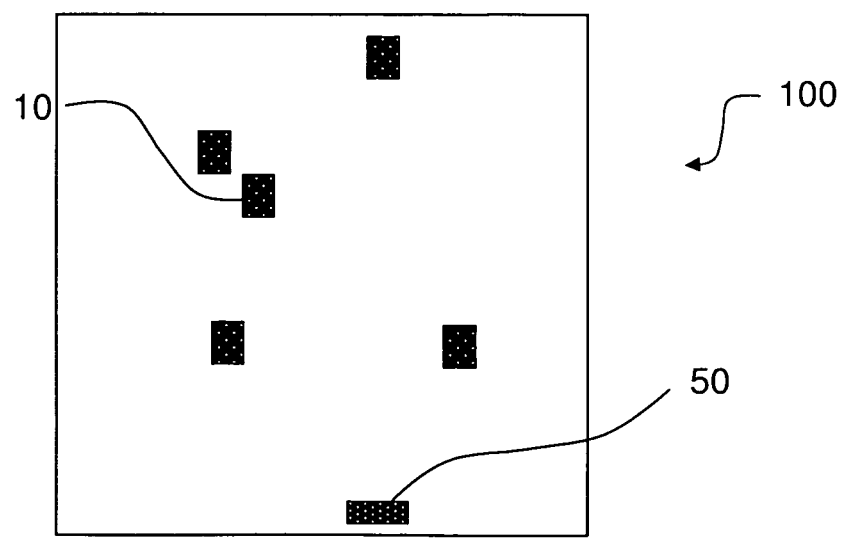
Figure 7E:
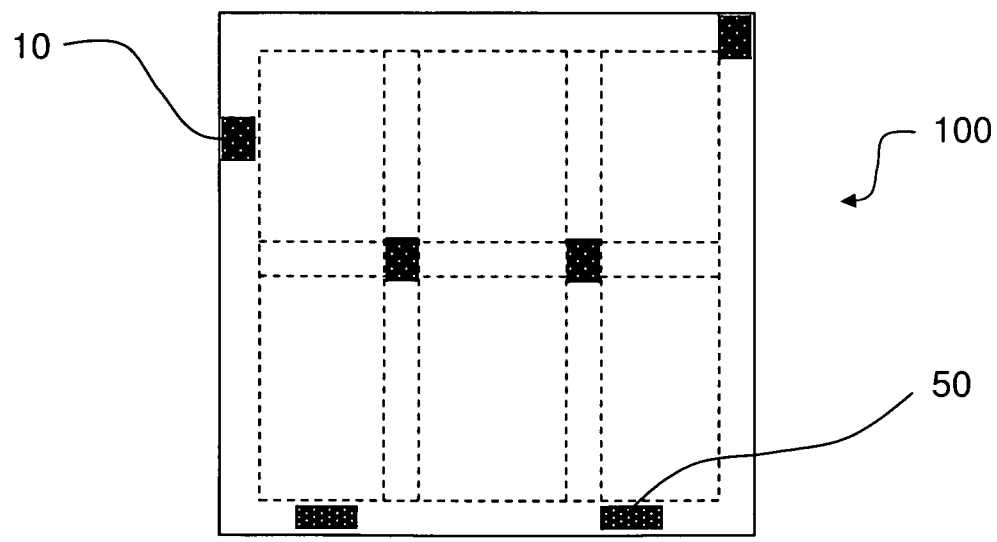

A further preferred embodiment of the multilayer panel 100 is shown in FIG. 6. As it can be seen from the figure, a panel core 40 is covered underside with a coating 85. On the opposite side of the core panel 40 a recess 190 can be seen, which is already pushed in with a respective header at the die panel during the production of the core panel 40. The semi-active tag is hereby fixed in such recess 190 and is shielded by a specific material 130 that has shock absorbing characteristics. In order to reach a simplification of the production process, first the tag can be applied on the panel core 40 and afterwards only surrounded above and at the edges by the shock absorbing material 130. Finally a second coating 80 is applied, which embed the absorption material 130 together with the tags. Here it is also advantageously that the tags 10, 50 are surrounded already by the absorption material 130 before their application on the panel core 40.

As already described in FIG. 4, the connecting insert 120 can be designed as a mat. Regarding the designs of these mats, different arrangements of either the passive, active, or semi active tags 10, 50 are shown in FIGS. 7a to 7e.

During the arrangement of the tags, advantages in production as well as on preferred arrangements regarding the use on building sites are taken into account. Due to the plurality of damages a multilayer panel 100 can suffer during its period of use, the use of several tags is very favorable.

Regarding this damages, they are usually concerned by holes or cuts which are caused by nailing, screwing or sawing. These damages can damage the tags embedded in the multi-layer panel 100 and make them useless. In order to ensure the identification ability up to a periodical renewal of the multi-layer panel, several tags will be simultaneously embedded with the connecting insert 120, respectively mat, which are described in FIG. 4, into the multilayer panel. In order to reach a sufficient statistical distribution of the tags 10, 50, these are positioned on circle, ellipse, or rhombic tracks. It is preferred to position the tags 10, 50 in coincidentally selected areas.

By using several tags 10, 50 in a multilayer panel, it is therefore particularly preferably to use passive transponders 10, because of the simple architecture these are manufactured cost efficient. Moreover, the accuracy of reading of passive transponder 10 in the surrounding of plastic and wood is very high, thus in this embodiment, the use of passive transponder 10 contrary to active or semi-active tags are preferable.

During the positioning of the tags particular areas proved as particularly favorable. As it is shown in the FIG. 7e, the tags are positioned in the areas in the multilayer panel 100, which are congruent with the below arranged frame element and its bracings. To meet the consideration that at sawing works, it cannot be sawed into to areas of the frame element and screw joints could not hold optimally due to the fact that the frame element or its bracings would prevent through-screwed. Regarding the tag distribution shown in FIG. 7e, a combination of passive tags 10 with active, and/or with semi active tags 50 is preferable, since their durability is increased by the special arrangement.

FIGS. 8 to 11 are showing schematically particularly preferred figures of a second embodiment of the formwork element according to the invention. The FIG. 8 exemplarily shows a top view of a frame element 200, which can embed the multilayer panel at the edges. The frame element 200 shown here is described by a circular right-angled profile, whereby the height of the edge profile matches with the height of a multilayer panel 100, in order to reduce unevenness, or visible transitions resulting from the use such form-worked concrete surfaces, to a minimum. In order to increase the torsion rigidity and to reach a maximum of dimension accuracy, reinforcing struts 220 are fixed to the frame element 200.

In order to be able to fix a perfectly fitted multilayer panel 100 in the frame element 200, hole supports 230 are mounted onto the frame element 200, so that a fixed or detachable connection, for example with rivets or screws can be made possible. According to the invention, it is of big advantage that at least one tag 10, or 50 is fixed to one inner side of the right-angled pipe which represents at least one side of the frame profile 200. Here, already before, during or after the production of the pipe profile shown in FIG. 9, an identification element 10, 50 is fixed form-locked or materially joined inside the right-angled pipe.

Such inserting can be done through the recesses, which are formed during the assembly of the frame profiles. The insertion of a tag, preferable a transceiver into the respective frame element, could be as well done belatedly through recesses which are drilled or sawed.

Since these pipe profiles 210 are welded or soldered during the production of the frame element 200 on the front sides to a right-angled, completely circular profile, it is preferable to use an active or semi-active tag. In order to bypass the numerous problems with the passive data communication technology in the periphery field of metals regarding field reflexions and field attenuation, according to the invention an active and/or semi active transceiver is used, which additionally provides an internal power supply.

By the use of at least one active or semi-active transceiver 50 a sufficient identification security can be guaranteed. Because of the fact that the active-respectively semi-active transceiver 50 provide a complex architecture, the active transceiver technology is more cost intensive than the passive transponder technology. Based on the preferable insertion of the transceiver 50 inside the pipe profile 210, the transceiver is therefore already sufficiently protected against damages so that regarding a formwork element according to the invention, not more than two or three transceivers 50 are needed.

In a not shown embodiment, the insertion of an identification element is possible by a recess in the outside wall of a pipe profile, whereby this recess can also be inserted subsequently. Because of this, a tag can be inserted into a frame or pipe element, or can be attached onto a frame in a pre-formed recess or cavity and can be fastened afterwards. The fixation or mounting can be obtained by adhesives, as for instance 2-component adhesives, light-curing adhesives, silicone or the like.

Figure 8:
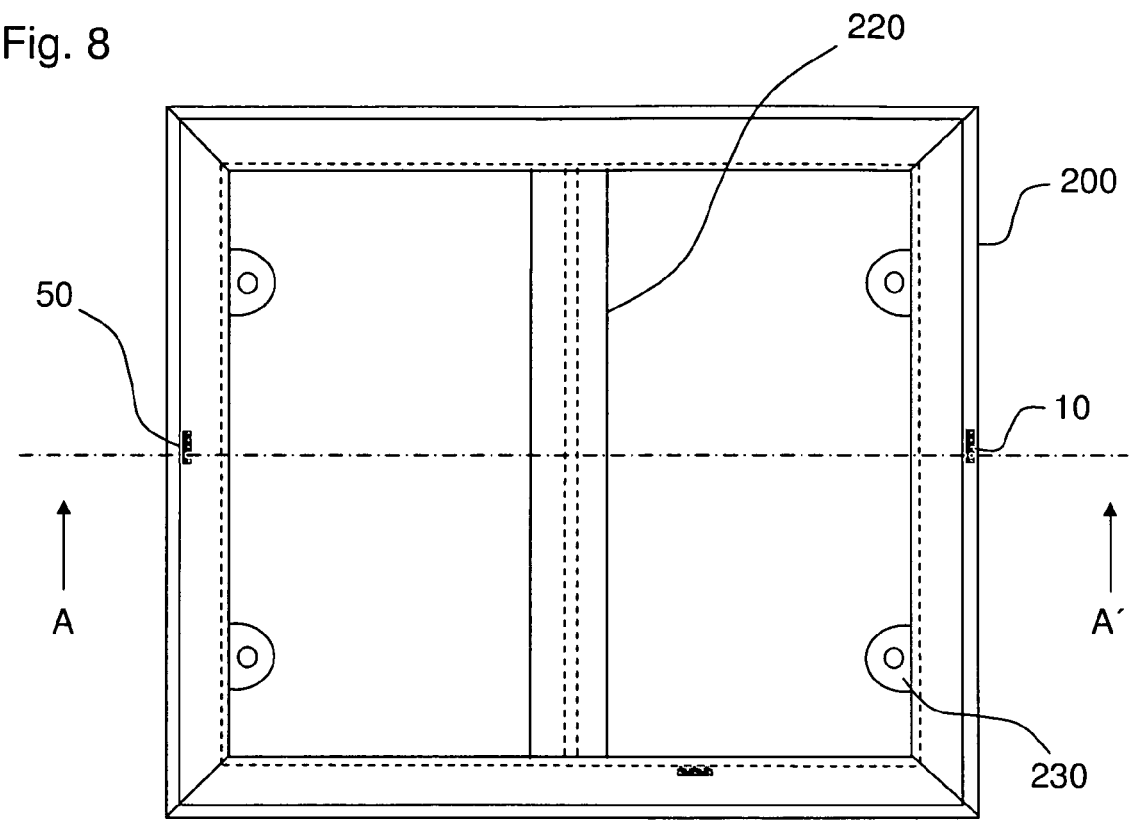
FIG. 8 shows a schematic top view of a frame element according to the invention of a second embodiment, whereby the frame element can surround a formwork panel at the edges.

Furthermore FIG. 8 shows a transponder 10, which is designed as an integral part of the pipe profile 210 and is located inside the frame element material. Steel is used as a predominantly frame material, which can be galvanized for simpler cleaning and corrosion protection. In addition, foamed metals or metal composite material, as well as plastic or ceramic composite materials regarding a weight reduction are preferable.

Regarding the problems of passive transponder 10, specified above, in framed formworks according to the invention, active or semi-active transceiver 50 are used based on the above mentioned RuBee standard. These RuBee tags 50 are sending active signals in a frequency range below 1 MHz, whereby the electromagnetic energy field for the induction provides a magnetic portion of at least 60%. The power supply of these active tags is usually guaranteed by a lithium battery.

In a not further described embodiment, the RuBee standard can be also realized with passive tags which can also provide different power supplies. Furthermore, these transceivers 50 can also provide an own IP address, whereby the tags can be localized over the Internet and their data can be read by readers in their surrounding area. Here the so called reader can write and/or read the tags contactlessly and can provide different designs, which could be used for example together with a mobile personal digital assistant (PDA), or constructed as a scanner unit for entry and exit control on sites, or fastened to construction machines. Within the production, the readers can be implemented into the production line and can write and/or verify the tags during or after the completion of the formwork elements according to the invention.

Figure 9:
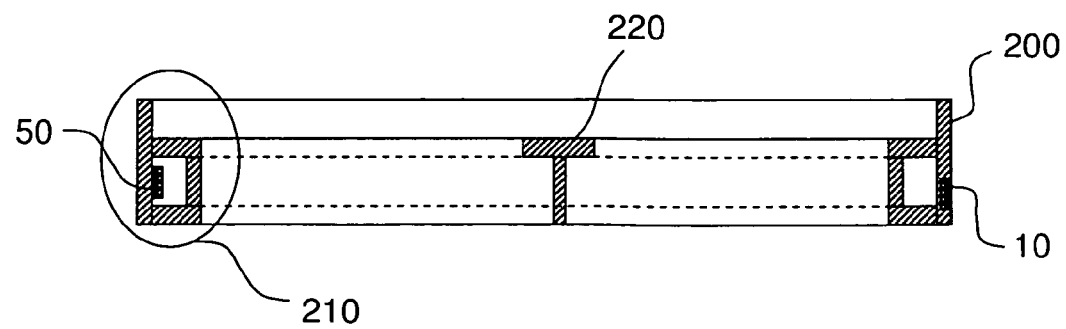
FIG. 9 shows a sectional view of the frame element showed in FIG. 8 along the line A-A'.

FIG. 9 shows the sectional view of the frame element 200 as shown in FIG. 8 along the line A-A' and makes the insertion of the active, respectively semi-active tag 50 inside the pipe profile 210 clear. FIG. 9 furthermore shows the integrally insertion of the transponder 10 into the frame element material.

Figure 10:
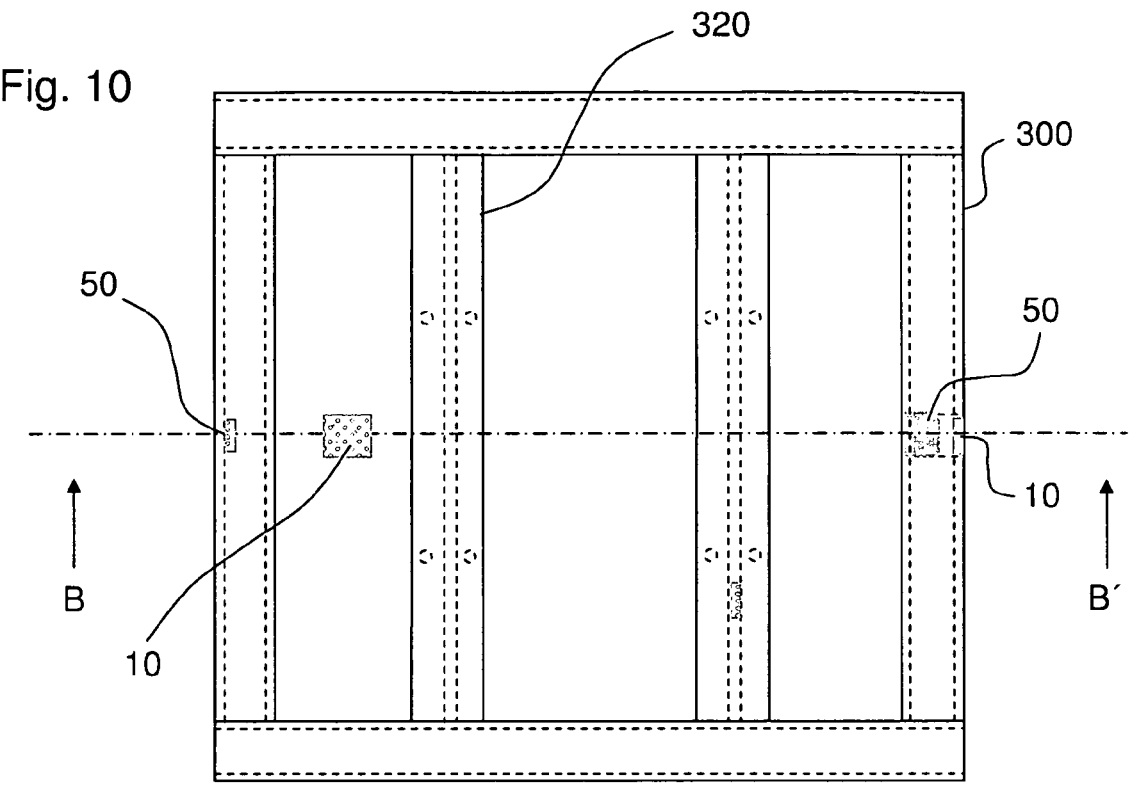
FIG. 10 shows a schematic underside view of a frame element according to the invention of a second embodiment, whereby the frame element covers the formwork panel on the underside.
Figure 11:
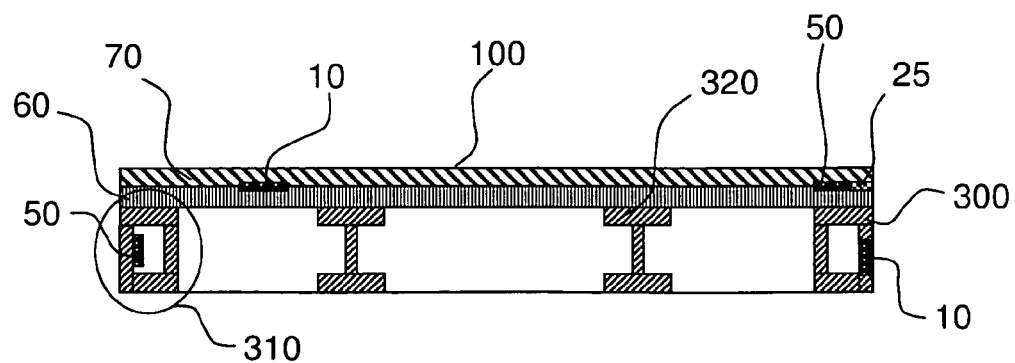
FIG. 11 shows a sectional view of the frame element showed in FIG. 10 along the line B-B'.

A schematic underside view of a frame element according to the invention of the second embodiment is shown in FIG. 10, whereby the frame element 300 surrounds the multilayer formwork board 100, which is designed as a solid board, from underneath. This embodiment of the frame element 300 is therefore preferable, because the multilayer full panel 100 corresponds at its edges with the below arranged frame element 300 in its dimensions. Thus at the lining-up of the formwork elements according to the invention, transitions and unevenness between the elements can be reduced to a minimum, which accordingly leads to a even concrete surface. Because of this advantage, the formwork element according to the invention is also used as a floor table or as circular formwork.

The sectional view as it can be seen in FIG. 11, it again clarifies the attachment of the transceiver 50 inside the pipe profile 310 and the insertion of a transponder 10 as integral part of the frame element 300, or its reinforcement struts 320. Exemplarily in can also be seen from FIG. 11 that a subsequently insertion of tags is possible, because of a lateral milled slots or cuts the tags 10, 50 can be inserted into these formed recesses and afterwards materially joined with the board 100 by an adhesive. Finally the remaining space in the recess can be sealed with a suitable fill material 25 or a plug so that the now internal tags 10, 50 are protected against weather related influences. This method can be regarded as exemplarily only and can be also applied to all other further embodiments of the present invention.

Figure 12:
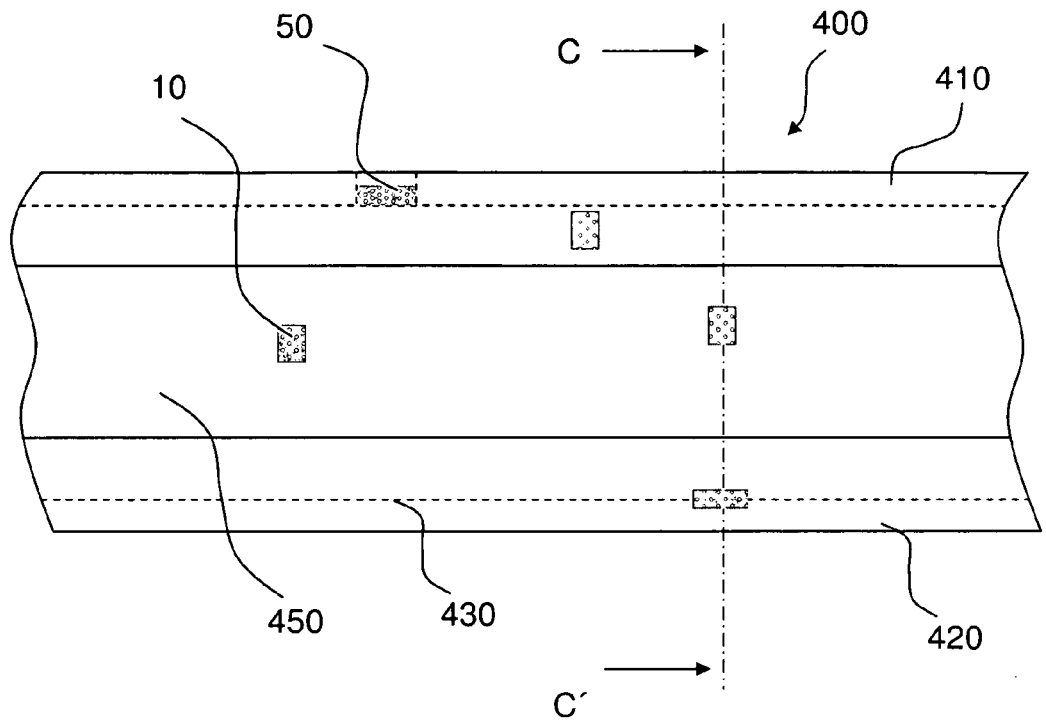
FIG. 12 shows a schematic partial side view of a formwork element according to the invention of a third embodiment, with a solid wall bar.

FIGS. 12 to 18 shows schematic particularly preferred third embodiment of the formwork element according to the invention. FIG. 12 shows a schematic part side view of a formwork beam 400, which represents a third embodiment of the formwork element according to the invention. Here a formwork beam 400 with a solid bar 450 is shown, which usually provides an I-formed beam cross-section. Furthermore, the solid bar 450 is at least partly surrounded be a top chord 410 and a bottom chord 420.

During the production of the generic formwork beams, the rectangular or sharp grooves 430 in the top chords 410, respectively bottom chords 420 are interlocked with the grooves 430 of the solid bar and build a force-locked connection which gains additional rigidity by a form-locked adhesive joint. The used tags 10, 50 can be already embedded in the multilayer panel, which is designed as a solid bar, or the tags are embedded into the joints between the solid bar 450 and the top chord 410, respectively the bottom chord 420.

Figure 13:
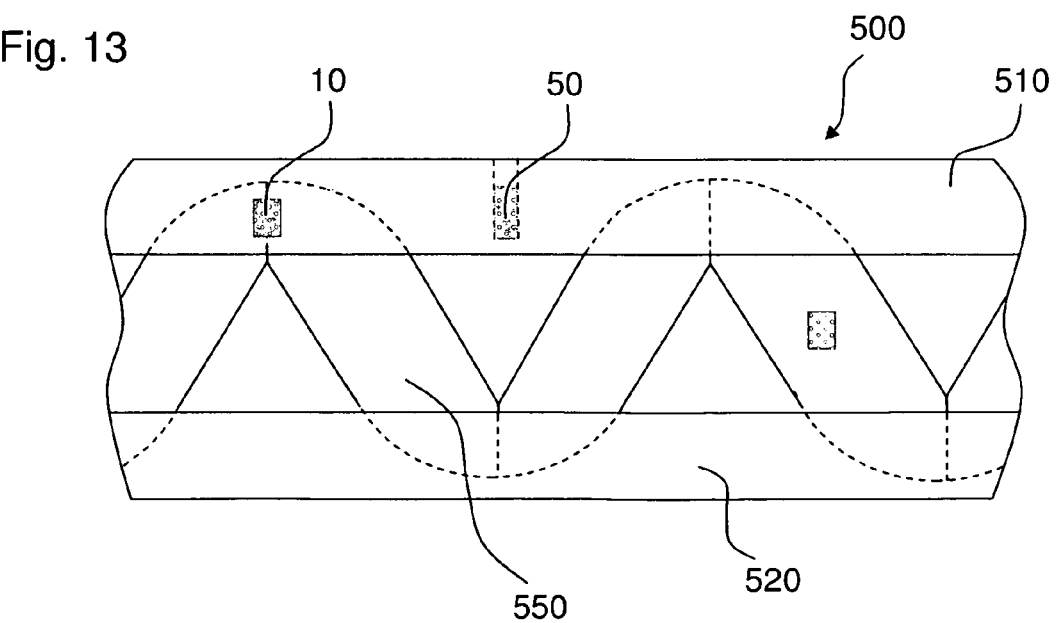
FIG. 13 shows a schematic partial side view of a formwork element according to the invention of a third embodiment, with a framework bar.

In contrast to the formwork beam shown in FIG. 12, the formwork beam 500 shown in FIG. 13 provides a framework bar 550, which is designed s-like, respectively wave-like and is additionally surrounded at least partially by a top chord 510, respectively bottom chord 520. The framework bar, or grid bar is characterized by a lower weight which has advantages at different applications. In view of the usage of framework bar 550 it is of advantage, if the single plate elements of a framework bar 550 consisting of multilayer panels, in which tags are already embedded. As well as shown in FIG. 12, the tags can also be inserted into the joints.

Figure 14:
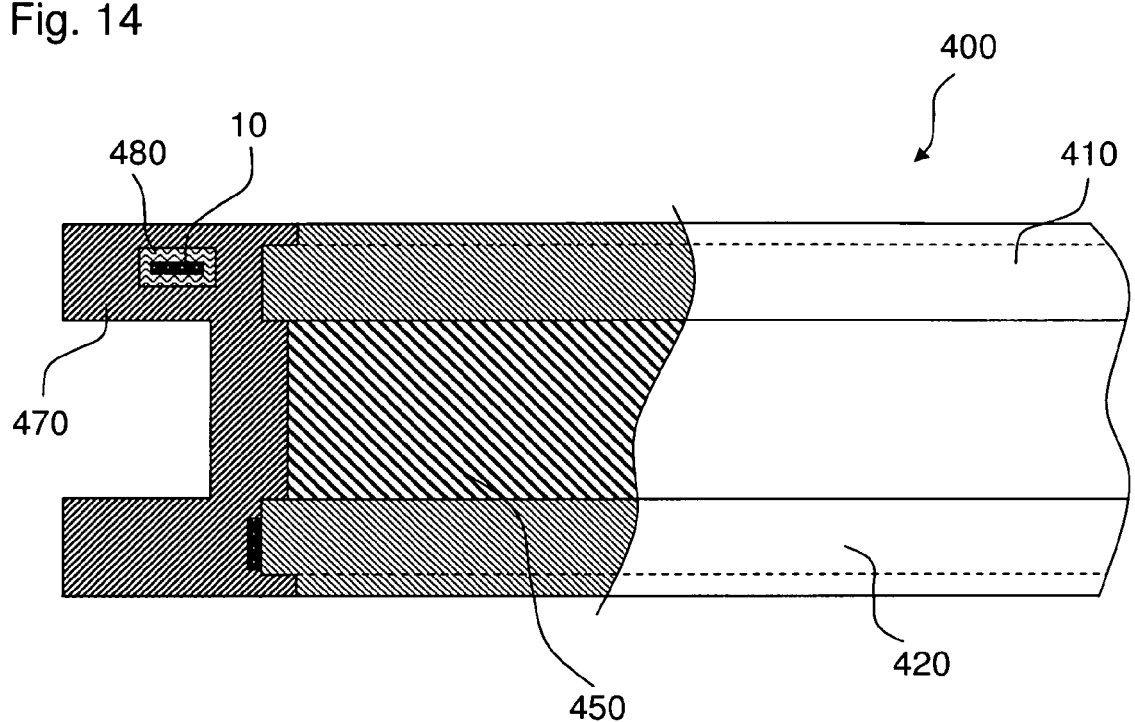
FIG. 14 shows a schematic partial side view of a formwork element according to the invention of a third embodiment, with a cover at the beam-ends.

A cover at the edges 470, as can be seen in the schematic part side view in FIG. 14, combines many advantages in connection with a formwork element according to the invention. In view of the large forces, which can result from mechanical loads as for example caused due to falling down of the formwork beam, such covers 470 at the beam-ends are reasonable, because of ensuring the dimensional stability but also to protect the beam against deformation. The cover 470 can be produced preferable with rubber, polypropylene based plastic, or thermoplastic plastics, because they can be easily handled in the production process and additionally provide sufficient shock absorbing abilities.

A further advantage of the formwork element according to the invention is that prefabricated or semi-finished covers 470 are already provided with tags so that no further changes in the production process of the formwork beams 400 occur, which leads beside time reduction as well to cost reductions. The fixation of the tags at the joints between the formwork beam 400 and the cover 470 can for example happen during the casting or molding process. The semi-finished covers 470 are fixed to the beam ends via adhesive and form a materially joined and permanent connection. In order to guaranty the operability of the tags 10, 50 inside the cover 470 it is preferable to encapsulate the tag with a material 480 which provides shock absorbing abilities.

Figure 15:
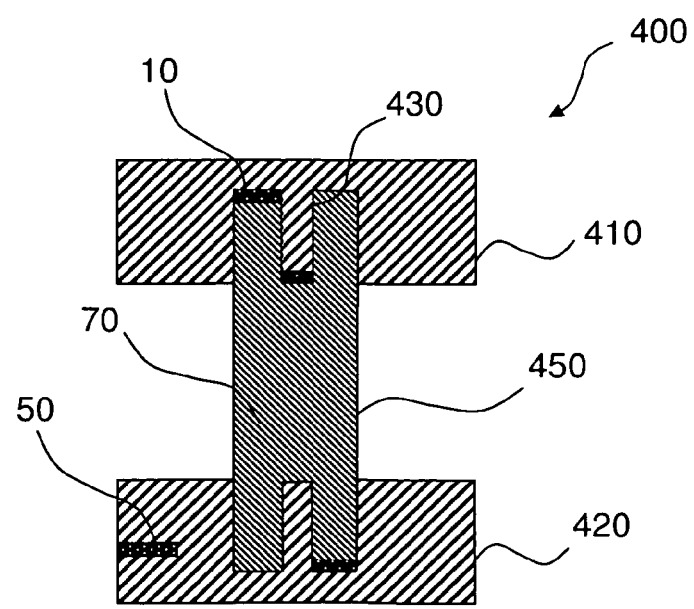
FIG. 15 shows a sectional view of a third embodiment of the formwork beam showed in FIG. 12 along the line C-C'.

The FIGS. 15 to 18 shows exemplarily, different sectional views of a formwork beam along the line C-C' of the formwork beam 400 shown in FIG. 12. A simple architecture of a formwork beam is shown in FIG. 15, whereby the solid bar 450 consist of one layer 70, as for example plywood panels, wood fiber panels or metal and the transponder 10 are fixed on the horizontal joints of the grooves 430 with the top-respectively bottom chord 410, 420. The top chord 410, respectively the bottom chord 420, are manufactured mainly from solid wood or from wood fiber composite materials, but there are also plastic or metal materials conceivable.

Figure 16:
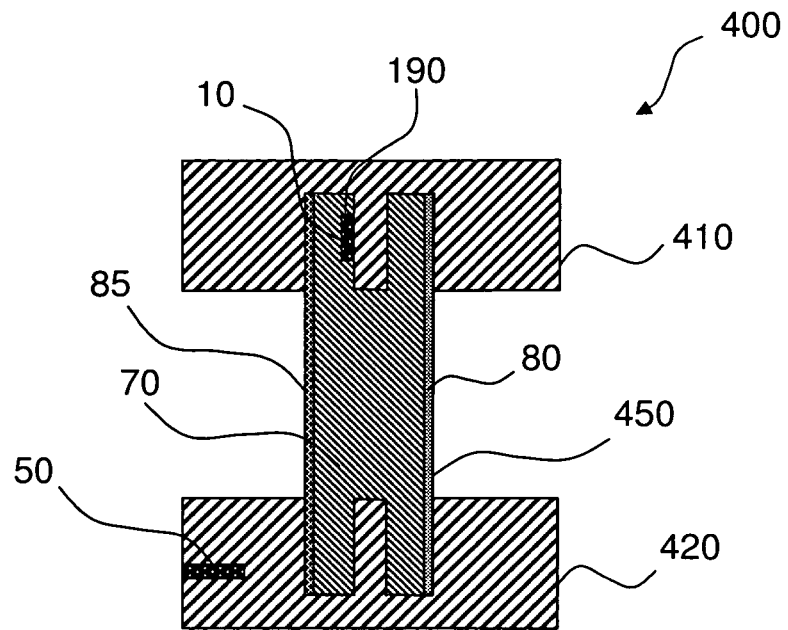
FIG. 16 shows a further sectional view of a third embodiment of the formwork beam showed in FIG. 12 along the line C-C'.

The sectional view shown in FIG. 16 shows exemplarily a solid wall bar 450 which consist of a base layer 70, a front coating 85 and a rear coating 80. From this it is evident that the transponders 10 in recesses 190 are placed in the grooves, which can prevent damages of the tags during the compression procedure of the bar 450 together with the beams 410, 420. The coatings can protect the layer 70 lying between them from environmental influences. In order to facilitate the subsequent insertion of tags 10, 50, recesses are brought in one or both chords so that one tag can fit in and can fixed with an adequate adhesive as for example a multi-component adhesive or an epoxy resin mixture.

Figure 17:
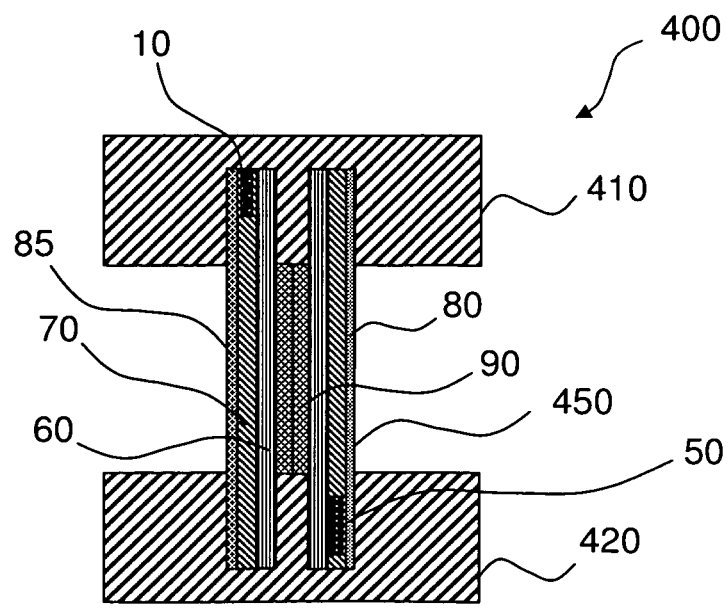
FIG. 17 shows a further sectional view of a third embodiment of the formwork beam showed in FIG. 12 along the line C-C'.

A solid wall bar 450, consisting of a multilayer panel is shown in FIG. 17. In this exemplarily embodiment of a formwork beam 400, the tags 10, 50 are inserted horizontally from above or below the bar 450. Preferable, a multilayer panel is used as bar, in which already identification elements are embedded, which facilitates the production process of the formwork beams enormously. Due to the multilayer architecture of the solid wall bar 450, the dimensional stability is taken into account.

Figure 18:
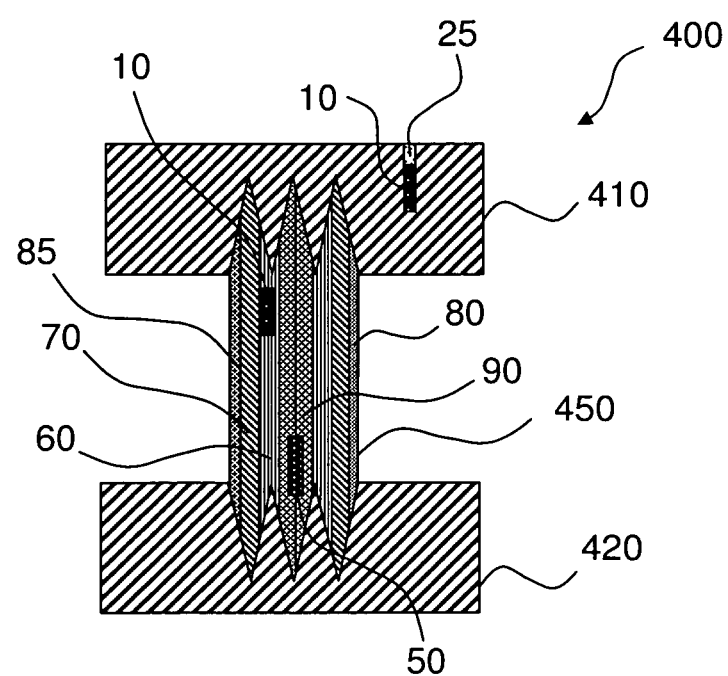
FIG. 18 shows a further sectional view of a third preferred embodiment of the formwork beam showed in FIG. 12 along the line C-C'.

A further exemplary embodiment of a formwork beam 400 is shows FIG. 18. A special feature are the pointed grooves, which forms a forced-locked and/or materially joined connection between the solid wall bar 450, the top chord 410 and the bottom chord 420. The here shown solid wall bar can be naturally be designed as a framework bar. In order to make the subsequent insertion of the tags 10, 50 as inconspicuous as possible, as it is shown in FIG. 18, a recess resulting from milling, cutting or drilling is sealed with filling material 25 after the insertion of the tags. Preferable, the filling material 25 provides similar color and structural characteristics than the surrounding material, in order to reduce the visual detectability to a minimum.

Figure 19:
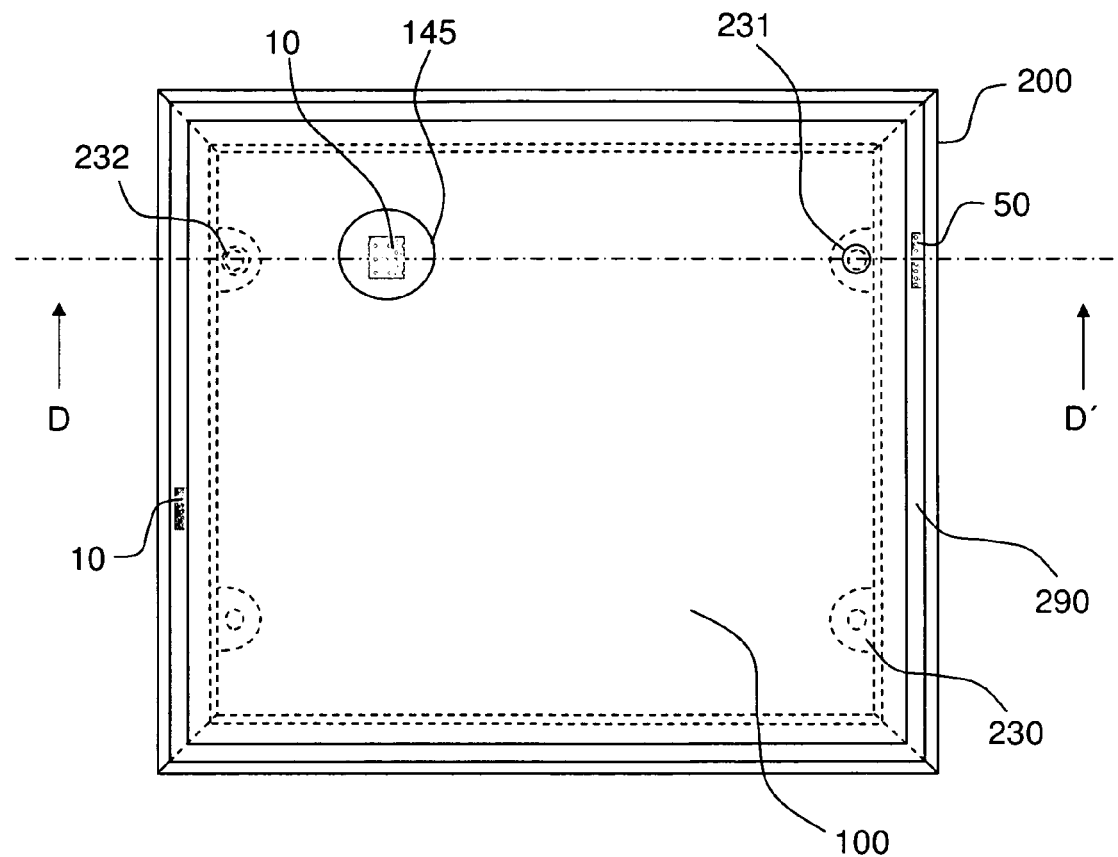
FIG. 19 shows a schematic top view of a further preferred embodiment of the first and second embodiment of the formwork element.
Figure 20:
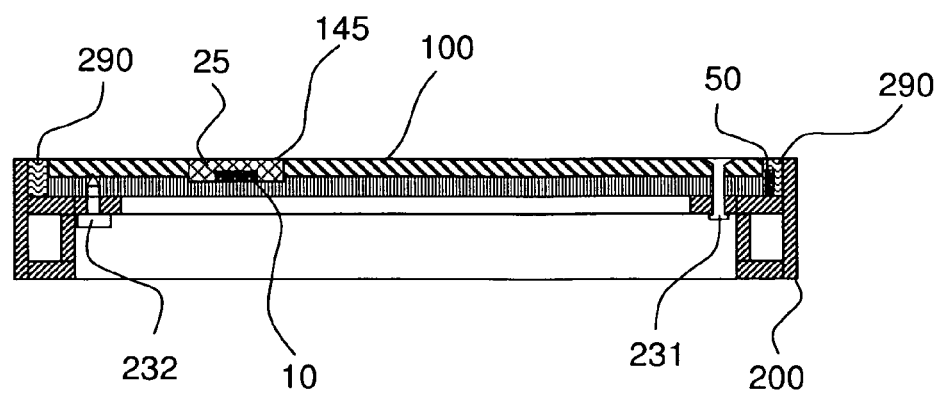
FIG. 20 shows a sectional view of the formwork element showed in FIG. 19 along the line D-D'.

The FIGS. 19 and 20 shows schematic further particularly preferred modification of the first and the second embodiment according to the invention. In FIG. 19 a formwork element is exemplarily shown that is designed as frame element 200 with a holder so that the multilayer panel 100 is embed by all sides at the edges into the frame element 200. Because of the fact that the multilayer panel 100 is manufactured from materials, which are able to make volumetric changes due to heat, cold or due to humidity, a circumferential gap at the edges is formed between the frame element 200 and the multilayer panel 100. This expansion-area is advantageously filled with an adequate filling material 290 so that unevenness or transitions between the panel 100 and frame element 200 are reduced to a minimum.

As likewise shown in FIG. 19, the tags 10, 50 are placed into the existing expansion-areas and filled with a flexible material 290, which are for example based on silicone, rubber or other flexible plastic materials. This allows the subsequent insertion of the tags 10, 50 in a simple and economical way. Particularly during repair work of a formwork element according to the invention, the already existing expansion-areas can be removed in order to be renewed together with the tags 10, 50 afterwards.

Regarding repair work, or in the course of routine checks of the formwork elements, the subsequent insertion of the tags can be done very cost-efficient as well as in a very timesaving way. Here, FIG. 20 provides a repair-place 145, which for example resulted from damages by nailing, screwing or by wrong handling. The thereby generated holes, scratches or splinterings can have a very bad effect on the appearance of the concrete surface, therefore these places are being cut out circularly.

Into these cylindrical recesses 145, a tag 10, 50 can be placed inside, fixed with an adhesive and the remaining recess 145 can be leveled with a filling material 25 afterwards. The filling material can be based on the basis of plastics, ceramic or metals, but in order to ensure the best adaptability in view of rigidity and appearance to the multilayer panel 100, a plug adapted to the hole can be placed in and be glued. As finalization of the repair work an additional coating also over the complete surface can be applied, which can coat and level the evolved unevenness.

The multilayer panel 100 can be connected with its surrounding frame element 200 form-locked and permanent by means of rivets 231, or by means of screws forced-locked and detachable. Thus an optimal connection between both elements of the formwork element according to the invention can be guaranteed depending upon areas of application.

Figure 21:
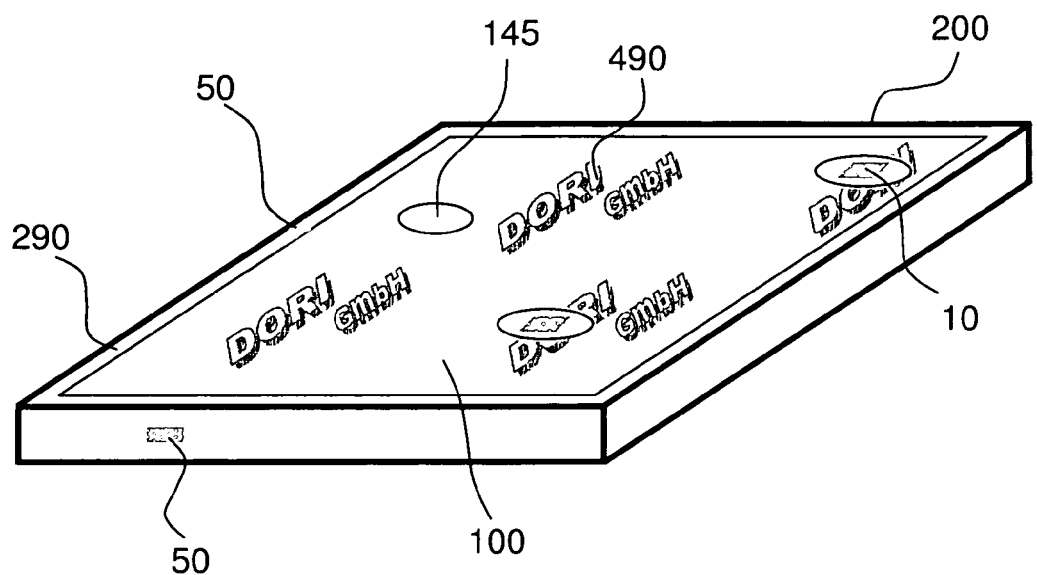
FIG. 21 shows exemplarily a schematic perspective view of a combination of the first, second embodiment of the formwork element according to the invention.

A schematic perspective view in the FIG. 21 shows a combination of the first and second embodiment of the formwork element according to the invention, whereby the multilayer panel 100 is preferable provided with logos 490 or advertisement as coating or as print. The formwork element here shows exemplarily the different areas of a formwork element where passive as well as active, respectively semi-active tags 10, 50 are inserted.

Figure 22:
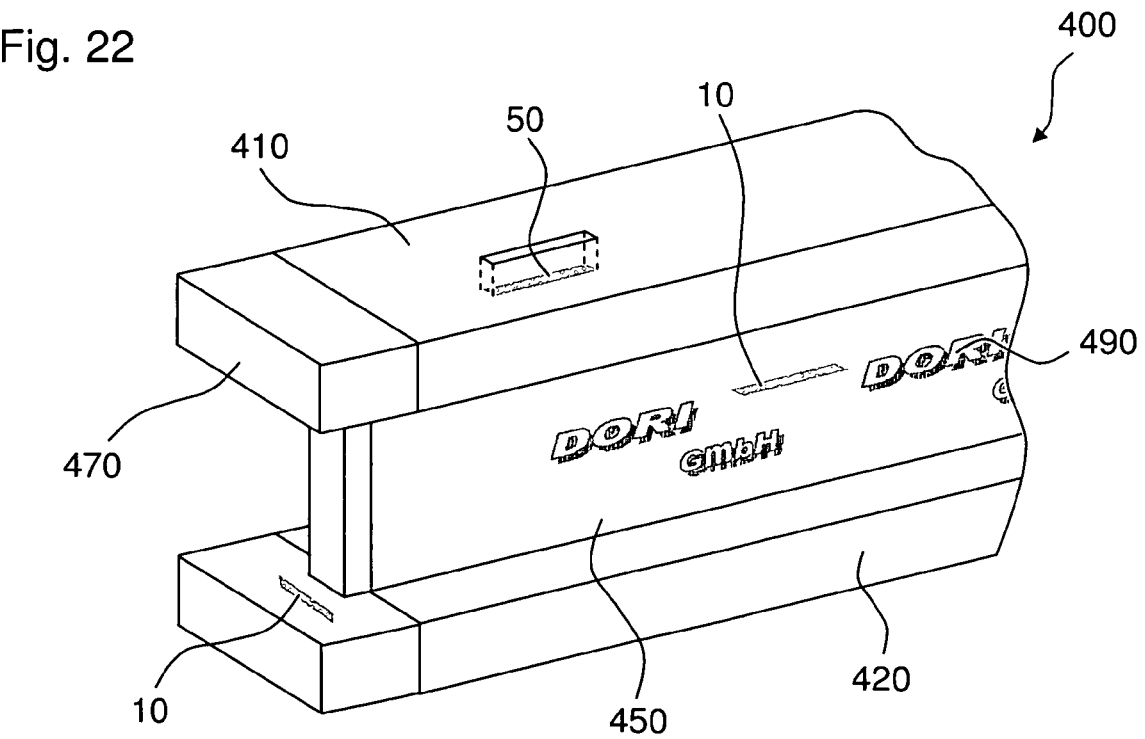
FIG. 22 shows exemplarily a schematic perspective view of a third embodiment of the formwork element according to the invention.

FIG. 22 however shows exemplarily a schematic perspective view of the third embodiment of the formwork element according to the invention, whereby also logos 490 or advertisement can be attach to the coating of the formwork beam 400 in order to increase the recognition-effect for example. The above described embodiments of a formwork element according to the invention are also presented in combination.

What is claimed is:

1. Formwork element for producing concrete and reinforced concrete structures comprises, in combination:
   (a) at least one multilayer panel; and
   (b) at least one frame element which at least partly surrounds the at least one multilayer panel, the frame element being formed as a panel carrier, and the frame element comprising at least one contactlessly writeable and/or readable electronic identification element,
   wherein the contactlessly writeable and/or readable electronic identification element is fixed inside the frame element.

2. A formwork element according to claim 1, wherein the multilayer panel comprises at least two layers and wherein between the at least two layers of the multilayer panel, at least one contactlessly writeable and/or readable electronic identification element is provided.

3. A formwork element according to claim 2, wherein the multilayer panel is connected with its surrounding frame element.

4. A formwork element according to claim 2, wherein at least one layer of the at least two layers of the multilayer panel is formed as a coating.

5. A formwork element according to claim 2, wherein between the at least two layers of the multilayer panel, the contactlessly writeable and/or readable electronic identification element is connected, materially-joined with the multilayer panel in such way that the identification element is not visible.

6. A formwork element according to claim 1, wherein the frame element is formed as a panel carrier which surrounds the multilayer panel at the edges and/or from the underside by all sides.

7. A formwork element according to claim 1, wherein the contactlessly writeable and/or readable electronic identification element is formed as an integral part of the frame element.

8. A formwork element according to claim 1, wherein the contactlessly writeable and/or readable electronic identification element is placed and fixed in a recess, which is formed in the structure of the frame element.

9. A formwork element according to claim 1, wherein the contactlessly writeable and/or readable electronic identification element is a transponder.

10. A formwork element according to claim 1, wherein the contactlessly writeable and/or readable electronic identification element is a transponder and uses a radio data communication technology with frequencies in the range between 3 MHz and 6 GHz.

11. A formwork element according to claim 1, wherein the contactlessly writeable and/or readable electronic identification element is a transponder and uses a radio data communication technology with frequencies in the range between 3 MHz and 6 GHz and wherein the magnetic portion of the used energy field is less than 45%.

12. A formwork element according to claim 1, wherein the contactlessly writeable and/or readable electronic identification element is a transceiver.

13. A formwork element according to claim 1, wherein the contactlessly writeable and/or readable electronic identification element is a transceiver and uses a radio data communication technology with frequencies in the range between 30 Hz and 1 MHz.

14. A formwork element according to claim 1, wherein the contactlessly writeable and/or readable electronic identification element is a transceiver and uses a radio data communication technology with frequencies in the range between 30 Hz and 1 MHz and wherein the magnetic portion of the used energy field is at least 60%.

15. Formwork element for producing concrete and reinforced concrete structures comprises, in combination:
   (a) at least one multilayer panel; and
   (b) at least one frame element which at least partly surrounds the at least one multilayer panel, the frame element being formed as a panel carrier, and the frame element comprising at least one contactlessly writeable and/or readable electronic identification element, the contactlessly writeable and/or readable electronic identification element being formed as an integral part of the frame element or being placed and fixed in a recess formed in the structure of the frame element.

16. A formwork element according to claim 15, wherein the recess in the frame element, in which the identification element is inserted, faces the outside.

17. A formwork element according to claim 15, wherein the recess in the frame element, in which the identification element is inserted, is disposed within the profile structure of the frame element.

18. Formwork element for producing concrete and reinforced concrete structures comprises, in combination:
   (a) at least one multilayer panel; and
   (b) at least one frame element which at least partly surrounds the at least one multilayer panel, the frame element being formed as a panel carrier, and the frame element comprising at least one contactlessly writeable and/or readable electronic identification element, the contactlessly writeable and/or readable electronic identification element being formed as an integral part of the frame element or being placed and fixed in a recess formed in the structure of the frame element, wherein the contactlessly writeable and/or readable electronic identification element is formed as an integral part of the frame element.

19. Formwork element for producing concrete and reinforced concrete structures comprises, in combination:
   (a) at least one multilayer panel; and
   (b) at least one frame element which at least partly surrounds the at least one multilayer panel, the frame element being formed as a panel carrier, and the frame element comprising at least one oontactlessly writeable and/or readable electronic identification element, the contactlessly writeable and/or readable electronic identification element being formed as an integral part of the frame element or being placed and fixed in a recess formed in the structure of the frame element, wherein the contactlessly writeable and/or readable electronic identification element is placed and fixed in a recess, which is formed in the structure of the frame element.

* * * * *